United States Patent [19]
Fukumochi et al.

[11] Patent Number: 5,299,124
[45] Date of Patent: Mar. 29, 1994

[54] TRANSLATION MACHINE CAPABLE OF ANALYZING SYNTACTIC OF SENTENCE

[75] Inventors: Yoji Fukumochi, Ikoma; Shuzo Kugimiya, Nara; Ichiko Sata, Nara; Tokuyuki Hirai, Nara; Takeshi Kutsumi, Yamato-Koriyama, all of Japan

[73] Assignee: Sharp Kabushiki Kaisha, Osaka, Japan

[21] Appl. No.: 819,500

[22] Filed: Jan. 10, 1992

[30] Foreign Application Priority Data

Jan. 10, 1991 [JP] Japan .................................. 3-1494

[51] Int. Cl.$^5$ ............................................. G03F 15/38
[52] U.S. Cl. ............................................. 364/419.02
[58] Field of Search ........................ 364/419.02, 419.01

[56] References Cited

U.S. PATENT DOCUMENTS 4,833,611  5/1989  Fukumochi et al. ................ 364/419
5,005,127  4/1991  Kugimiya et al. .................. 364/419

FOREIGN PATENT DOCUMENTS 345423  7/1991  Japan .

OTHER PUBLICATIONS

Patent Abstract of Japanese Application No. 1-38874.

Primary Examiner—Roy N. Envall, Jr.
Assistant Examiner—Khai Tran
Attorney, Agent, or Firm—David G. Conlin; Robert F. O'Connell; Peter F. Corless

[57] ABSTRACT

A translation machine which is capable of analyzing a syntactic of a sentence having a complicated or an ambiguous modifying structure of the words composing the sentence includes a dictionary consulting and morpheme analyzing unit (151) for consulting dictionaries and for analyzing morphemes of a sentence in a source language input to the translation machine so as to provide a part of speech of the analyzed morpheme, a syntactic analysis unit (152) connected to the dictionary consulting and morpheme analyzing unit (151) for analyzing a syntactic of the sentence based on the obtained parts of speech of the morphemes by using grammatical rules stored in the dictionary consulting and morpheme analyzing unit (151), a transforming unit (153) connected to the syntactic analysis unit (152) for transforming the analyzed syntactic into a syntactic of a target language, a translated sentence creating unit (154) connected to the transforming unit (153) for creating a translated sentence of the target language, and a break setting unit (155) connected to the syntactic analysis unit (152) for determining whether or not the syntactic analysis unit (152) fails in the syntactic analysis of the sentence and for setting breaks to proper locations of the sentence according to the breaking rules at a time when the syntactic analysis fails.

9 Claims, 4 Drawing Sheets

TRANSLATION MACHINE CAPABLE OF ANALYZING SYNTACTIC OF SENTENCE

BACKGROUND OF THE INVENTION

1. Field of the Invention

The present invention relates to a translation machine which enables to create a natural translated sentence, more particularly, the translation machine which is capable of analyzing a syntactic of a sentence whose words are modified in a complicated or ambiguous manner.

2. Description of the Related Art

The inventors of the present invention know a translation machine which is operated to enter a source language input from a keyboard into a translation module under the control of a main central processing unit (CPU). The translation module serves to translate the source language into a target language through the use of dictionaries and rules such as grammatical rules and tree-structure transforming rules stored in a memory.

In translation, the syntactic of the source language is analyzed in the translation module as follows. Words composing one sentence contained in the read source language are stored in a buffer. Using the dictionary stored in the memory, the translation module serves to derive the part of speech of each word stored in the buffer. Then, the proper grammatical rules are picked out of the memory for setting up the modifying relation among the parts of speech of the words. Based on the picked grammar rules, a parse tree is created indicating how the words composing the sentence are modified. The syntactic analysis process for the source language done in the known translation machine is the bottom-up analysis of a syntactic based on the local information, that is, the grammar rules about the parts of speech and the phrases of the words.

The bottom-up analysis of a syntactic based on the local information implemented in the known translation machine has the following shortcomings.

To analyze a sentence having a complicated or ambiguous modifying structure of words composing the sentence, the modifying relation is often erroneously recognized. In a case that one phrase of the sentence is erroneously recognized, the syntactic analysis is carried out on the basis of the erroneously-recognized modifying relation of one phrase, resulting in creating the erroneous syntactic analysis.

Alternatively, in a case that the erroneously-recognized modifying relation of one phrase results in bringing about failure of the syntactic analysis, thereby failing in creation of a parse tree, and the translation is carried out for each phrase. Hence, the resulting translated sentence does not have the proper structure in the target language.

For example, consider the sentence of the source language "After independence from the U.K. in 1962, the country started election." This sentence consists of a prepositional phrase, a comma, and a declarative sentence.

The foregoing known translation machine may fail in analyzing a syntactic, because the translation machine does not store in the memory the grammatical rules appropriate to form one parse tree about the example sentence. As such, the known translation machine operates to divide the example sentence into:

Three prepositional phrases
 "After independence"
 "from the U.K."
 "in 1962"
Comma ","
Declarative sentence
 "the country started election."

Then, the syntactic analysis is carried out for each phrase and the declarative sentence. As a result, the known translation machine offers the translated sentence of:

·늁立す ‖ イギリスから ‖ 1962 年に ‖、‖ その国は、選挙を開始した。 which does not have a natural Japanese syntactic as a target language.

SUMMARY OF THE INVENTION

It is, therefore, an object of the present invention to provide a translation machine which is capable of carrying out the bottom-up syntactic analysis of a sentence based on the local information even if the sentence has a complicated or ambiguous modifying structure of the words composing the sentence and creating an accurate and natural translated sentence.

The object of the present invention can be achieved by a translation machine which is capable of analyzing a syntactic of a sentence having a complicated or an ambiguous modifying structure of the words composing the sentence includes a unit for consulting dictionaries and for analyzing morphemes of a sentence in a source language input to the translation machine so as to provide a part of speech of the analyzed morpheme, a unit connected to the consulting and analyzing unit for analyzing a syntactic of the sentence based on the obtained parts of speech of the morphemes by using grammatical rules stored in the dictionary consulting and morpheme analyzing unit, a unit connected to the syntactic analysis unit for transforming the analyzed syntactic into a syntactic of a target language, a unit connected to the transforming unit for creating a translated sentence of the target language, and a unit connected to the syntactic analysis unit for determining whether or not the syntactic analysis unit fails in the syntactic analysis of the sentence and for setting breaks to proper locations of the sentence according to the breaking rules at a time when the syntactic analysis fails.

Preferably, the translation machine further includes a unit for storing breaking rules, the breaking rules being formed from human's experiential knowledge about sentence breaks.

More preferably, the translation machine further includes a unit connected to the determining unit for storing a translated counterpart in the target language of each phrase of the input sentence in the source language delimited by the breaks being set thereto, the translated counterpart being created through an effect of the syntactic analysis unit, the transforming unit, and the creating unit.

Further preferably, the unit for storing breaking rules is a memory.

The translation machine further includes a main central processing unit for controlling the input of sentence in the source language to the dictionary consulting and morpheme analyzing unit, a main memory for storing the sentence in the source language, a cathode-ray tube for displaying the translated sentence, a keyboard for allowing a user to give indications to the central processing unit, and a printer for printing the translated sentence, preferably.

The breaking rule is preferably arranged to include one or more subrules.

The subrules include a retrieve start location, a retrieval range, a retrieval condition, a process, and a processing location, preferably.

The grammatical rules preferably include a sentence=declarative sentence+sentence tail, a declarative sentence=declarative sentence+subordinate sentence, a declarative sentence=noun phrase+verb phrase, a noun phrase=noun phrase+prepositional phrase, a noun phrase=noun, a noun phrase=article+noun, a verb phrase=verb+noun phrase, a verb phrase=verb phrase+noun phrase, a prepositional phrase=preposition+noun phrase, a sentence=prepositional phrase (for division), and a sentence=prepositional phrase+-comma (for division).

The source language is English and the target language is Japanese, preferably.

In operation, when a sentence of a source language is entered into the translation machine, the dictionary consulting and morpheme analyzing unit serves to divide the sentence into the morphemes by using the dictionary stored in the memory so as to obtain the part of speech of each morpheme. Then, based on the part of speech of each morpheme, the syntactic analysis unit serves to analyze the syntactic of the sentence by using the grammatical rules stored in the memory. The break setting unit determines whether or not the syntactic analysis of the sentence is successful. If yes, the resulting syntactic-analyzed result is converted into the syntactic of a target language in the transforming unit. Finally, the translated sentence creating unit serves to create the translated sentence written in the target language from the syntactic.

If, on the other hand, the syntactic analysis is not successful, the break setting unit serves to read a breaking rule from the breaking rule storage unit. The breaking rules are created from the human's experiential knowledge about sentence breaks. The sentence whose syntactic analysis is not successful is analyzed according to the read breaking rule so that proper breaks are set to the sentence. Then, the sentence is separated to some phrases at the set breaks. For each phrase, the syntactic analysis is carried out in the syntactic analysis unit. Based on the syntactic-analyzed result obtained for each phrase, the resulting translated sentence is created through the effect of the transforming unit and the translated sentence creating unit. Then, the translated counterparts for the phrases are respectively stored in the translated sentence storing unit. When terminating the creation of the translated sentence composed of all the translated phrases, the translated counterpart for each phrase is read until the output translated phrases compose the sentence written in the target language. It results in completing the output of the translation of the sentence whose syntactic analysis is not successful.

As mentioned above, if the input sentence of the source language has so a complicated or ambiguous modifying structure of the words composing the sentence that the syntactic analysis of the sentence is not successful, the present translation machine serves to automatically set breaks at proper locations, resulting in making it possible to analyze the syntactic and translate the input sentence into the sentence of the target language based on the syntactic.

Further objects and advantages of the present invention will be apparent from the following description of the preferred embodiments of the invention as illustrated in the accompanying drawings.

DESCRIPTION OF THE PREFERRED EMBODIMENTS

Referring to the accompanying drawings, an embodiment of a translation machine according to the present invention will be described in details in the followings.

Figure 1:
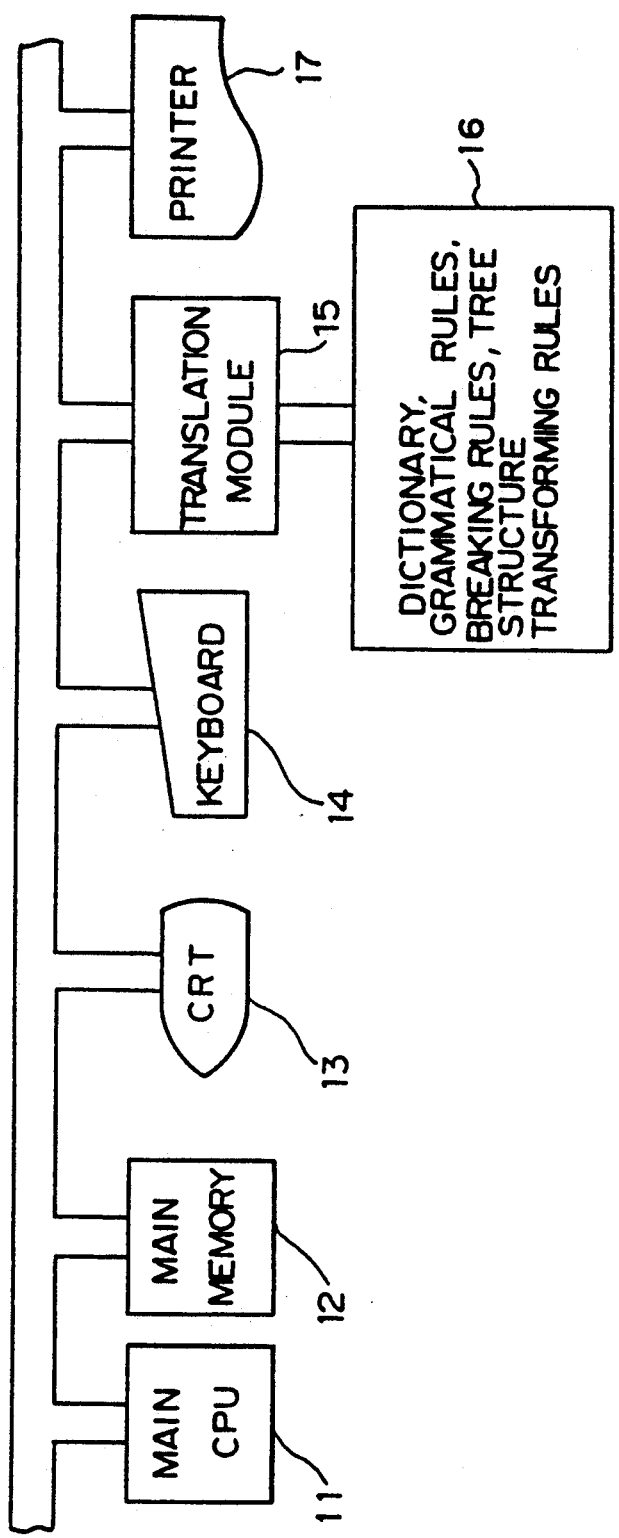
FIG. 1 is a block diagram showing a translation machine according to an embodiment of the present invention.

FIG. 1 is a block diagram showing a translation machine according to an embodiment of the present invention.

As shown in FIG. 1, the translation machine includes a central processing unit (CPU) 11, a main memory 12, a cathode-ray tube (CRT) 13, a keyboard 14, a translation module 15, a memory 16 for storing a translation dictionary and tree-structure transforming rules such as grammatical rule and breaking rules, and a printer 17 for printing the resulting translation on paper.

The memory 16 is composed of the breaking rules storing unit.

The translation module 15 serves to translate a sentence in a source language entered from the keyboard 14 into the sentence in a target language, that is, the translated sentence. The source-language sentence entered from the keyboard 14 is sent to the translation module 15 under the control of the main CPU 11. The translation module 15 serves to translate the source-language sentence into a sentence in a source language by using the dictionary, the grammatical rules, the breaking rules and the tree-structure transforming rules stored in the memory 16. The resulting translated result is printed on paper by the printer 17.

The main CPU 11 operates to control the CRT 13, the keyboard 14, the translation module 15, and the printer 17 for proceeding the translation process.

The main memory 12 stores a translation program used in the main CPU 11. On the CRT 13, the input sentence in the source language, the translated sentence in the target language, and several kinds of indications are displayed. A user can do any specification from the keyboard 14.

Figure 2:
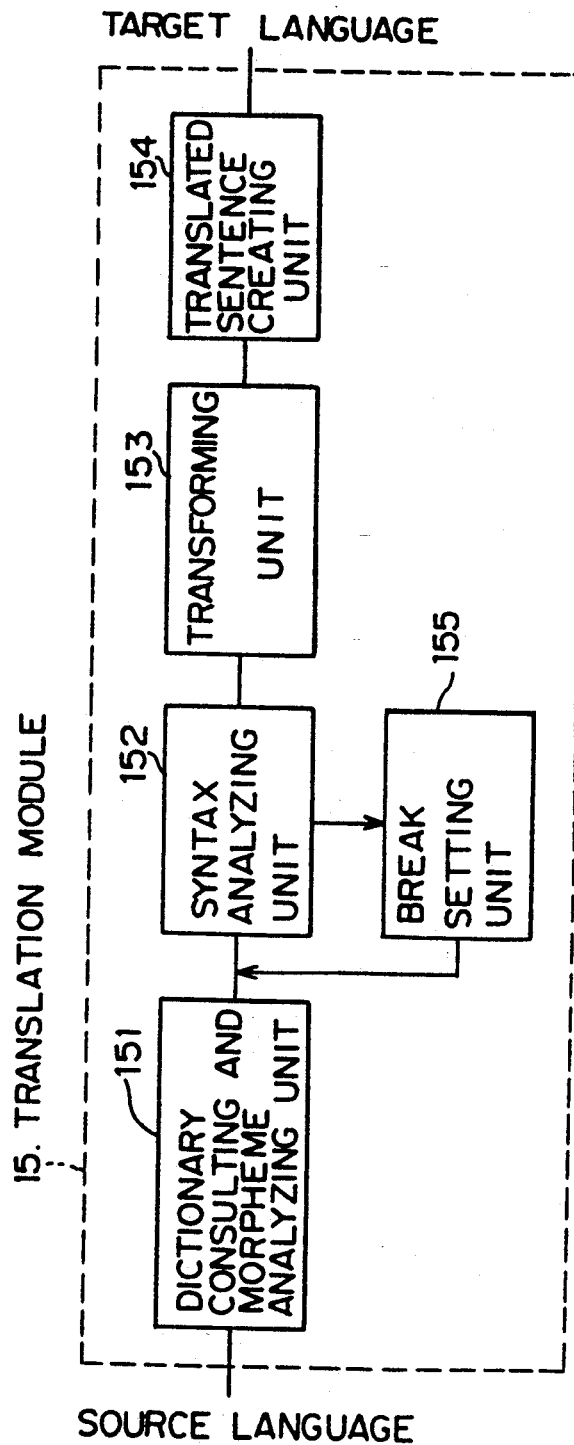
FIG. 2 is a block diagram showing a translation module included in the translation machine shown in FIG. 1.

FIG. 2 is a block diagram showing a structure of the translation module 15. The translation module 15 is composed of a dictionary consulting and morpheme analyzing unit 151, a syntactic analysis unit 152, a transforming unit 153, a translated sentence creating unit 154, and a break setting unit 155.

The translating process executed by the translation module 15 will be described with reference to FIGS. 1 and 2.

The input sentence stored in a buffer is divided into morphemes (words) by the dictionary consulting and morpheme analyzing unit 151. The translated word and the grammatical information such as a part of speech for each divided word can be obtained by using the dictionary stored in the memory 16. Further analysis of each word is done to derive a tense, a person and a number. This analyzing process will be referred to as dictionary consulting and morpheme analyzing process.

Next, the syntactic analysis unit 152 serves to form the structure-analyzing tree indicating how the words are modified by using the dictionary and the grammatical rules stored in the memory 16. This process will be referred to as syntactic analysis. In a case that a phrase of the input sentence is erroneously recognized and a proper syntactic analysis tree is not allowed to be created, the break setting unit 155 serves to automatically set the breaks to the most approximate locations of the input sentence, and the syntactic analysis unit 152 serves to analyze the syntactic again.

The transforming unit 153 serves to transform the structure of the syntactic analysis tree of the input sentence written in the source language into the structure of the syntactic analysis tree in the target language. Then, the translated sentence creating unit 154 adds proper Japanese particles and auxiliary verbs to the syntactic analysis tree of the target language for offering the translated sentence.

The resulting translated sentence is output from the translation module 15 and is printed on paper by the printer 17. In turn, the detailed description will be directed to the grammatical rules and the breaking rules stored in the memory 16 concerning the syntactic analysis of the source language.

The grammatical rules are the rules for setting up the modifying relation among the parts of speech when analyzing the syntactic and building the syntactic analysis tree. In this embodiment, these rules are defined as shown in Table 1.

TABLE 1

(a) sentence = declarative sentence + sentence end
(b) declarative sentence = declarative sentence + subordinate sentence
(c) declarative sentence = noun phrase + verb phrase
(d) noun phrase = noun phrase + prepositional phrase
(e) noun phrase = noun
(f) noun phrase = article + noun
(g) verb phrase = verb + noun phrase
(h) verb phrase = verb phrase + prepositional phrase
(i) prepositional phrase = preposition + noun phrase
(j) sentence = prepositional phrase (for division)
(k) sentence = prepositional phrase + comma (for division)

The grammatical rule (a) indicates that a sentence consists of a declarative sentence and a sentence end.

The grammatical rule (b) indicates that a declarative sentence consists of a declarative sentence and a subordinate sentence.

The grammatical rule (c) indicates that a declarative sentence consists of a noun phrase and a verb phrase.

Likewise, in Table 1, the grammatical rules (d) to (k) indicate that the phrases and the sentences described on the left sides of the equal symbols respectively consist of the parts of speech, the phrases, the sentences and the comma described in the right sides of the equal symbols.

In this embodiment, however, the grammatical rules consist of the foregoing grammatical rules (a) to (k) only.

In turn, the breaking rules will be described in detail. The breaking rules are the rules used for automatically setting the breaks to the most approximate locations of the input sentence if the sentence has so complicated or ambiguous modifying structure of the words that the syntactic analysis tree of the sentence is not allowed to be created. The breaking rules are formed from the human's experiential knowledge about the sentence breaks. By automatically setting the breaks to the sentence whose modifying structure of the words is complicated or ambiguous, it is possible to obtain the proper phrases of the sentence. According to the present embodiment, the format shown in Table 2 is obtained.

TABLE 2

| RULE NUMBER | CONTENT OF BREAKING RULE | |
|---|---|---|
| 1 | TP, NR, +, , | Comma |
| | LK, 1, +, , | Subordinate Conjugate |
| | LK, 1, +, SB, −2 | Noun (nominative), Pronoun (nominative), Article |
| 2 | TP, 0, +, , | Preposition |
| | LK, NR, +, , | Comma |
| | LK, 1, +, SB, −1 | Preposition, Noun (nominative), Article |
| 3 | LK, 0, +, , | Preposition |
| | LK, NR, +, , | Comma |
| | LK, 1, +, SB, −1 | Preposition, Noun (nominative), Article |
| 4 | ... | ... |
| ... | ... | ... |

Herein, the description will be directed to the rules for representing the breaking rules shown in Table 2.

The breaking rules are, as shown in Table 2, arranged to have one or more subrules. Each subrule is represented by the chain type of the following items:

"retrieve start location, retrieval range, retrieval condition, process, and processing location, keys".

The keys denote a part of speech to be retrieved, a morpheme attribute, a header, and a fine classification.

In a case that two or more keys are provided for one subrule, those keys are ranged with commas therebetween. The retrieve start location is a location at which the retrieval is started when a predetermined key is retrieved in this sentence. The retrieval range is a range in which a predetermined key is retrieved in this sentence and stands for the number of words to be retrieved from the retrieve start location. The retrieval condition means the content for establishing the retrieval condition about the predetermined key in the predetermined retrieval range of the sentence. The process means the content of the process to be executed for the sentence if the predetermined retrieval condition is met. The process location is the location at which a predetermined process is executed for the sentence.

The characters, the symbols and the figures standing for the contents of the items composing the subrule indicated in Table 2 have the following meanings. That is to say, (1) Retrieve start location
   TP: Sentence head
   LK: Location of key meeting retrieval condition one previous to this retrieval
(2) Retrieval Range
   NR: limitless
   1: up to the location of the next word
   0: only this word
(3) Retrieval Condition
   +: Retrieval condition is met if the key to be retrieved lies in the retrieval range.

—: Retrieval condition is met if no key to be retrieved lies in the retrieval range.

(4) Process
Blank: Proceed to the next subrule.
SB: Set the break.

(5) Process Location
−1: Process the word one previous this word.
−2: Process the word two previous to this word.

The breaking rule of the rule No. 3 shown in Table 2 is arranged to have three subrules, each of those subrules representing the following content.

First Subrule: Retrieve a part of speech "comma" limitlessly from the sentence head. If the "comma" exists, the subrule proceeds from the first to the second subrule.

Second Subrule: It retrieve the part of speech "subordinate conjunction" from the location of the key meeting the one previous retrieval condition to the location of the next word. That is, it is checked whether or not the word next to the "comma" meeting the retrieve condition in the first subrule is "subordinate conjunction". If it is, the subrule proceeds from the second to the third subrule.

Third Subrule: It retrieves a word whose part of speech is "noun" and morphemic attribute is "nominative", a word whose part of speech is "pronoun" and morphemic attribute is "nominative" or a word whose part of speech is "article" in the range from the location of the key meeting the one previous retrieval condition to the location of the next word. It is checked whether the word next to the "subordinate conjunction" meeting the retrieval condition of the second subrule belongs to "noun" and "nominative", "pronoun" and "nominative", or "article". If the word belongs to "noun" and "nominative", "pronoun" and "nominative" or "article", the break is set to the location of the word (that is, "comma") two previous to this word.

The translation machine arranged as mentioned above operates to translate the source language into the target language according to the procedure indicated below.

Figure 3:
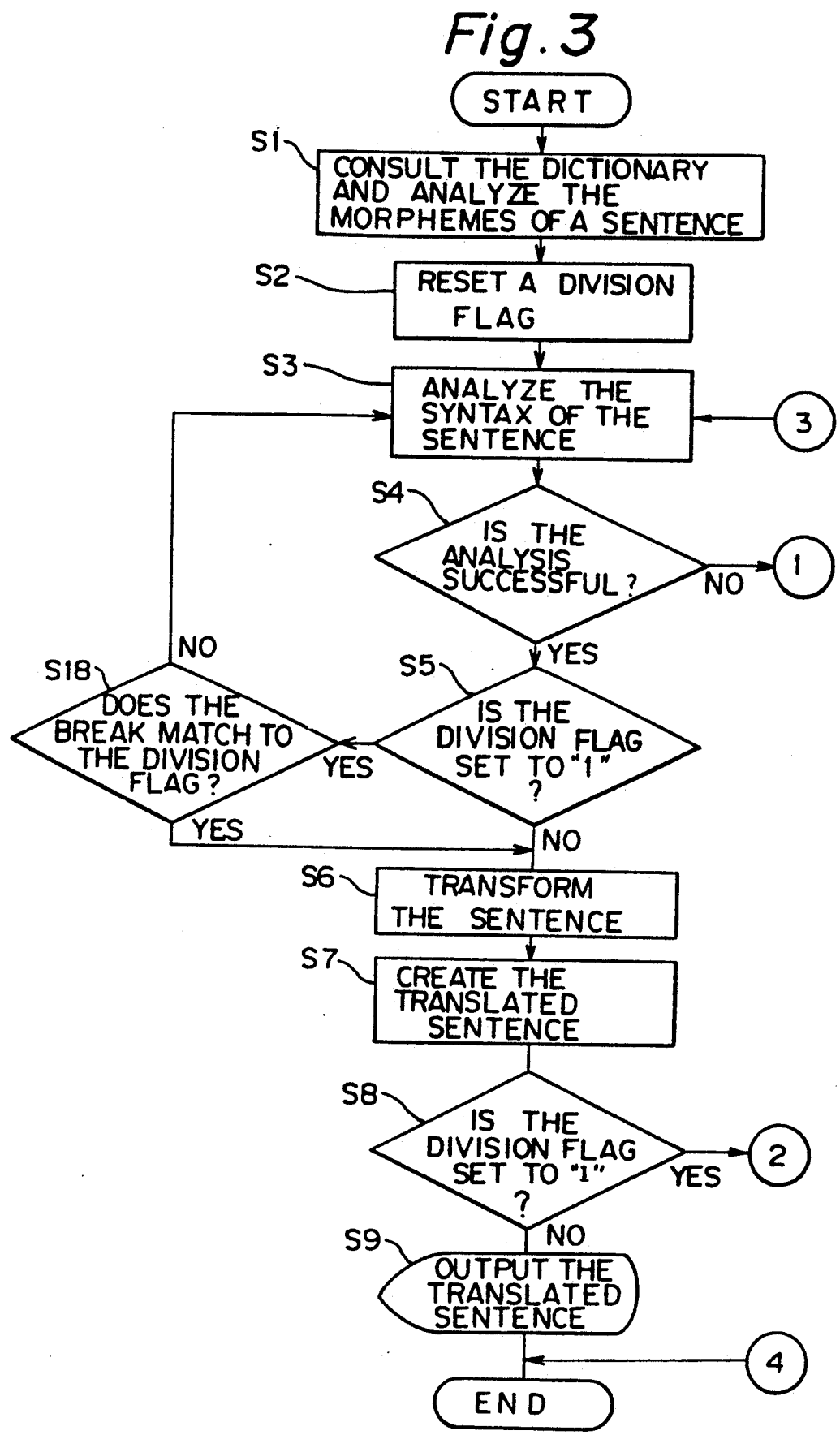
FIG. 3 is a flowchart showing a normal translating operation about one sentence.
Figure 4:
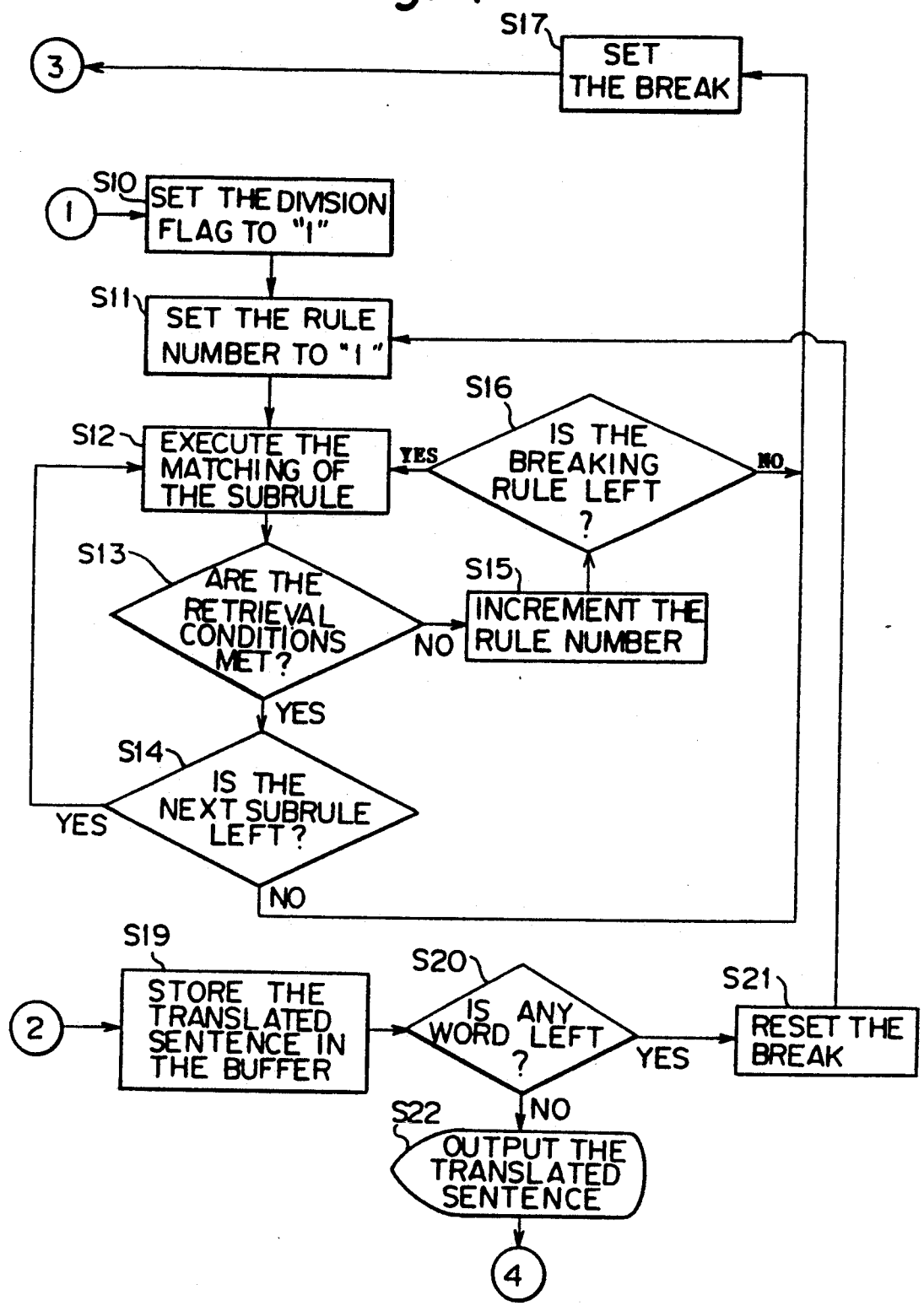
FIG. 4 is a flowchart showing a translation operation about one sentence following the translating operation shown in FIG. 3.

FIGS. 3 and 4 are flowcharts illustrating the translating process of one sentence executed in the translation module 15.

Herein, the translating process about one sentence will be described in detail with reference to FIGS. 3 and 4.

The dictionary consulting and morpheme analyzing unit 151 serves to consult the dictionary and analyze the morphemes of the sentence written in the source language (step S1).

The content of a divisional flag is reset (step S2).

Based on the part of speech of each morpheme obtained by the operation at the step S1, the syntactic is analyzed by using the grammatical rules stored in the memory 16 (step S3).

To read the grammatical rule for modifying the morphemes properly from the memory 16, the syntactic analysis tree of this sentence is created (step S4). Then, it is checked whether or not the syntactic analysis is successful. If yes, the process goes to a step S5. If no, the process goes to a step S10.

It is checked whether or not the content of the division flag is "1" (step S5). If it is not "1", the process goes to a step S6. If it is "1", the process goes to a step S18.

Since the syntactic analysis of this sentence is successful, the transforming unit 153 serves to transform the syntactic analysis tree of the source language obtained at the step S3 into the syntactic analysis tree of the target language (step S6).

The translated sentence creating unit 154 serves to proofread the translated sentence obtained at the step S6 for outputting the proofread translated sentence of the target language having the proper style (step S7).

It is determined whether or not the content of the division flag is "1" (step S8). If it is not "1", the process goes to a step S9, while if it is "1", the process goes to a step S19.

The translated sentence of the target language created at the step S7 is output on the CRT 13 (step S9). Then, the translating process of this sentence is terminated.

The translating process at the steps S1 to S9 holds true for the sentence having so simple modifying structure of the words composing the sentence that the erroneous recognition of the words is unlikely to take place.

Next, the description will be directed to the translating process which holds true for the sentence having so complicated or ambiguous modifying structure of the words of the sentence that the erroneous recognition of each phrase is likely to take place. In this process, it is considered that the erroneous recognition of a phrase takes place so that the syntactic analysis of the sentence is failed. At the step S4 of the foregoing translating process, it is determined that the syntactic analysis is not successful failed and the process goes to a step S10.

The content of the division flag is set to "1" so that the break setting unit 155 starts to operate (step S10). The break setting unit 155 operates to insert breaks at proper locations so as to prevent erroneous recognition of the phrases of this sentence.

At a step S11, "1" is set to a rule number.

The breaking rule for the set rule number is read from the memory 16 (step S12). The sentence is matched to the first mismatch subrule contained in the breaking rule.

It is determined whether or not the retrieval condition of the first mismatch subrule is met (step S13). If yes, the process goes to a step S14 and if not, to a step S15.

At a step S14, it is determined whether or not the breaking rule has the next subrule. If yes, the process goes to the step S12 at which the matching operation is repeated. If not, the process goes to a step S17.

Since the retrieval condition of the breaking rule is not met, the content of the rule number is incremented (step S15).

It is determined whether or not the breaking rule of the rule number set at the step S15 is stored in the memory 16 (step S16). If yes, the process returns to the step S12 at which the similar operation is executed for the breaking rule of the next rule number. If not, the process goes to a step S17.

At the step S17, the retrieval conditions of all the subrules in the breaking rule have been met. Hence, the process set to the final subrule of the breaking rule (that is, setting a break) is executed. If no breaking rule meeting the retrieval condition is stored in the memory 6, the process is executed for the end of the sentence.

As described above, the breaks are set to the proper locations of the sentence so that no erroneous analysis of the sentence into phrases takes place. Then, returning to the step S3, the syntactic analysis is executed again for the sentence which is analyzed into proper phrases by the foregoing break setting operation. If the syntactic analysis is met as a result of analyzing the syntactic at the step S3, since the divisional flag is set to "1" at the step S10, the process proceeds from the step S5 located after the syntactic is analyzed again to the step S18.

It is determined whether or not the location of the morpheme at the tail of the syntactic analysis tree obtained as a result of analyzing the syntactic at the step S3 is matched to the location of the morpheme located at the break set at the step S17 (step S18). If it is not matched, the process returns to the step S3 at which the syntactic analysis tree is built again. If, on the other hand, matched, the process proceeds to the steps S6 and S7 at which the transforming and the creating processes are executed for the syntactic analysis tree of the phrase of the sentence delimited by the break.

At the step S8, it is determined that the content of the division flag is set to "1". Then, the process proceeds to a step S19.

The translated counterpart of the phrase of the sentence delimited by the break, which was created at the step S7, is stored in the buffer (not shown) serving as the translated sentence storage unit (step S19).

It is determined whether or not any untranslated word is left in the sentence (step S20). If yes, the process goes to a step S21 and if not, to a step S22.

The process executed at the step S17 (that is, the break being set to a morpheme) is reset (step S21).

Returning to the step S11, the spot to be delimited by a break is retrieved again in the phrase still being delimited. If a new spot is found, the transforming and the creating processes are executed for the new phrase delimited at the new spot by the break. The translating process of the sentence further proceeds until it is determined that no untranslated word is left at the step S20 (that is, the translating process proceeds to the tail of this sentence). Then, the process goes to a step S22.

At the step S22, the translated counterparts of the phrases composing the sentence, those phrases having been delimited by the breaks set by the step S17, are read from the buffer and output on the CRT 13.

Finally, the translating process is terminated for such a sentence as having so complicated or ambiguous modifying structure of the component words that the syntactic analysis of the sentence may fail.

As set forth above, the translating process of one sentence is arranged to automatically set breaks to the most approximate locations of the input sentence by the break setting unit 155 by using the breaking rule based on the human's experiential knowledge about the breaks if the input sentence of the source language has so complicated or ambiguous modifying structure of the words that the erroneous syntactic analysis of the sentence may takes place.

The present translating process, therefore, makes it possible to correctly recognize the phrases composing the input sentence having the relatively complicated or ambiguous modifying structure of the words, resulting in being able to correctly translate the phrases into the translated counterparts.

For describing the translating process concretely, two example sentences are referred, one having the relatively simple modifying structure of the words and the other having the complicated or ambiguous modifying structure of the words. Reference is made to FIGS. 3 and 4 and the source language is English and the target language is Japanese.

(A) Sentence having the relatively simple modifying structure of the words

Consider the sentence (A) of:

"The country started election after independence from the U. K. in 1962."

is input. Then, the dictionary consulting and morpheme analyzing operation is executed. Next, the syntactic analysis is carried out for building the syntactic analysis tree of the sentence (A) by using the grammatical rules (f), (e), (g), (i), (h), (c) and (a) stored in the memory. It means that the analysis of the sentence (A) is made possible (refer to the above-describe steps S1 to S3).

The syntactic analysis tree of English built at those steps is transformed into the syntactic analysis tree of Japanese. Then, the proper Japanese particles and auxiliary verbs are added to the Japanese syntactic analysis tree. The resulting translated sentence of the input English sentence (A):

"その国は、1962 年のイギリスからの独立後、選挙を開始した"

is output on the CRT 13 (refer to the above-describe steps S4 to S9).

(B) Sentence having the complicated or ambiguous modifying structure of the words.

Consider the sentence (B) of:

"After independence from the U.K. in 1962, the country started election."

is input. Like the sentence (A), the dictionary consulting and morpheme analyzing operation is executed and then the syntactic analysis is carried out for building the syntactic analysis tree of the sentence (B) by using the grammatical rules (e), (f), (i), (g), (d) and (c) stored in the memory 6. The syntactic of the sentence (B) is analyzed as:

Prepositional phrase +Comma +Declarative Sentence

As is obvious from Table 1, the grammatical rules for processing the prepositional phrase located at the head of the sentence are the rules (j) and (k). The grammatical rule (j) holds true for the prepositional phrase for division. The grammatical rule (k) holds true for the comma for division. However, the comma contained in the sentence (B) is not definitive, the comma for division or that for parallel disposition. Hence, the application of the grammatical rules (j) and (k) to the sentence (B) is not made possible. It means that no grammatical rules applicable to the sentence (B) are stored in the memory 16. As such, the syntactic analysis of the sentence (B) does not become successful. Then, the content of the division flag is set to "1", so that the divisional translating process is started with the comma located in the sentence (B) being assumed as a comma for division (refer to the above-describe steps S1 to S4, S10).

The breaking rules stored in the memory 16 are read in sequence from the breaking rule of the rule No. "1". The sentence (B) is being matched to the subrules composing each breaking rule (refer to the above-described steps S11 to S16).

Since the sentence (B) has a preposition "After" at its head, a comma located after the preposition "After", and an article "the" next to the comma, it has turned out that the sentence (B) meets the retrieval conditions of all the subrules composing the breaking rule of the rule No. 2. Hence, a break is set to the morpheme ",", immediately before the article "the" (refer to the above-describe steps S13, S14, S17).

Next, the syntactic analysis is repeated. Since the content of the division flag is set to "1", the application of the grammatical rules (j) and (k) to the sentence is made possible.

In this syntactic analysis of the sentence, the phrase "After independence" is analyzed as a prepositional phrase. In this case, however, the morpheme "independence" located at the tail of the syntactic analysis tree does not coincide with the morpheme "," to which the break is set. Hence, the syntactic analysis further proceeds.

Next, using the grammatical rules (e), (f), (i) and (d), the phrase "After independence from the U.K." is syntactic-analyzed as a prepositional phrase. However, the morpheme "U.K." located at the tail of the syntactic analysis tree does not coincide with the morpheme "," to which the break is set. The syntactic analysis further proceeds. Using the grammatical rules (e), (f), (i), (d) and (k), the phrase "After independence from the U.K. in 1962," is syntactic-analyzed as a sentence. In this case, the morpheme "," located at the tail of the syntactic analysis tree is matched to the morpheme "," to which the break is set. The syntactic analysis tree of "After independence from the U.K. in 1962," is transformed into the Japanese counterpart. Then, the proper Japanese particles and auxiliary verbs are added to the Japanese syntactic analysis tree, resulting in creating the Japanese phrase:

"1962" 年のイギリスからの独立後に、

The Japanese phrase is stored in the buffer.

As mentioned above, though the normal translating process may fail in the syntactic analysis of the sentence (B), the present translating process is capable of automatically setting a break to the most approximate location of the sentence (B) according to the breaking rule, so that it enables to recognize the phrase ranging from the head to the break-set location as a proper phrase. The translating process, therefore, succeeds in syntactic analysis of the sentence (B) (refer to the above-described steps S3 to S5 and S18, S6 to S8 and S19).

Since the untranslated words "the country started election" are left in the sentence (B), the break being set to the morpheme "," is reset and the divisional translating process is executed again. Since no breaking rule meeting the retrieval condition is left, the break is set to the tail "." of the sentence (B). Like the foregoing process, the syntactic analysis is repeated until the morpheme "," at the tail of the syntactic analysis tree for "the country started election." matches to the morpheme "." to which the break is set (refer to the above-describe steps S20, S21 and S11 to S17, S3 to S5 and S18).

The phrase "the country started election" is syntactic-analyzed as a sentence by using the grammatical rules (f), (e), (g), (c) and (a). Then, the syntactic analysis tree of the word train "the country started election." is transformed into the Japanese counterpart. The proper Japanese particles and auxiliary verbs are added to the Japanese syntactic analysis tree, resulting in creating the translated sentence:

" その国は、選挙を開始した。 "

The Japanese sentence is stored in the buffer (refer to the above-described steps S3 to S5 and S18, S6 to S8 and S19).

Since no word is left in the sentence (B), the two Japanese sentences stored in the buffer are output in the CRT 13. The output sentences have " ｜｜ " located therebetween like: (refer to the above-described steps S20 and S22).

As described above, the present embodiment is arranged to create the breaking rules containing the items of retrieve start location, retrieval range, retrieval condition, process, processing location and key and store those rules in the memory 16. If the normal translating process fails in the syntactic analysis of the source-language sentence, the break setting unit 155 serves to read the breaking rule which contains the key for meeting all the retrieval conditions from the memory 16. Then, the process described at the final subrule of the breaking rule is executed so as to set the break to the processing location.

In a case that, therefore, the translating process has failed in analyzing the syntactic of the input sentence of the source language, the proper phrases being delimited by the breaks are correctly recognized. As such, the syntactic analysis of each phrase is made possible, resulting in correctly translating the source language into the target language for each phrase.

According to the foregoing embodiment, the grammatical rules stored in the memory 16 include only the grammatical rules (a) to (k) shown in Table 1. However, the other grammatical rules may be added.

The forms of the breaking rules are not defined as the forms as shown in Table 2. What the invention requires is that those rules should be formed on the human's experiential knowledge about the sentence break.

According to the foregoing embodiment, the breaking rule storing unit is composed of the memory 16. However, another means may be provided therefore.

The algorithm for the translating process of one sentence is not defined to that of the foregoing embodiment.

According to the foregoing embodiment, the source language is English and the target language is Japanese. It goes without saying that the present invention is not limited to those definitions of the source and the target languages.

Many widely different embodiments of the present invention may be constructed without departing from the spirit and scope of the present invention. It should be understood that the present invention is not limited to the specific embodiments described in the specification, except as defined in the appended claims.

What is claimed is:

1. A translation machine which is capable of analyzing a syntactic of a sentence having a complicated or an ambiguous modifying structure of words composing the sentence, said translation machine comprising:
   means for consulting dictionaries and for analyzing morphemes of a sentence in a source language input to said translation machine so as to provide a part of speech of said analyzed morpheme;
   means connected to said consulting and analyzing means for analyzing said syntactic of said sentence based on said part of speech of said analyzed morpheme by using grammatical rules stored in said dictionary consulting and morpheme analyzing means;

means connected to said syntactic analysis means for transforming said analyzed syntactic into a syntactic of a target language;

means connected to said transforming means for creating a translated sentence of said target language; and means connected to said syntactic analysis means for determining whether or not said syntactic analysis means fails in said syntactic analysis of said sentence in accordance with a phrase recognition of said input sentence in said source language and a creation of a proper syntactic analysis tree, and for setting breaks to proper locations of said sentence according to breaking rules at a time when said syntactic analysis fails.

2. A translation machine according to claim 1, wherein said translation machine further comprises means for storing said breaking rules, said breaking rules being formed from human's experiential knowledge about sentence breaks.

3. A translation machine according to claim 1, wherein said translation machine further comprises means connected to said determining means for storing a translated counterpart in said target language of each phrase of said input sentence in said source language delimited by said breaks being set thereto, said translated counterpart being created through an effect of said syntactic analysis means, said transforming means, and said creating means.

4. A translation machine according to claim 1, wherein said means for storing breaking rules is a memory.

5. A translation machine according to claim 1, said translation machine further comprises a main central processing unit for controlling the input of sentence in said source language to said dictionary consulting and morpheme analyzing means, a main memory for storing said sentence in said source language, a cathode-ray tube for displaying said translated sentence, a keyboard for allowing a user to give indications to said central processing unit, and a printer for printing said translated sentence.

6. A translation machine according to claim 1, wherein said breaking rule is arranged to include one or more subrules.

7. A translation machine according to claim 6, wherein said subrules include a retrieve start location, a retrieval range, a retrieval condition, a process, and a processing location.

8. A translation machine according to claim 1, wherein said grammatical rules include a sentence=declarative sentence+sentence tail, a declarative sentence=declarative sentence+subordinate sentence, a declarative sentence=noun phrase+verb phrase, a noun phrase=noun phrase+prepositional phrase, a noun phrase=noun, a noun phrase=article+noun, a verb phrase=verb+noun phrase, a verb phrase=verb phrase+noun phrase, a prepositional phrase=preposition+noun phrase, a sentence=prepositional phrase (for division), and a sentence=prepositional phrase+comma (for division).

9. A translation machine according to claim 1, wherein said source language is English and said target language is Japanese.

* * * * *